Feb. 20, 1968  R. H. BRANDT ET AL  3,369,451
MOUNTING BELT FOR FILM TRANSPARENCIES
Filed July 27, 1966  2 Sheets-Sheet 2
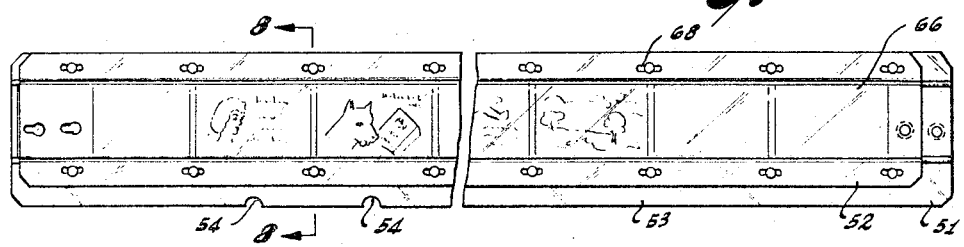
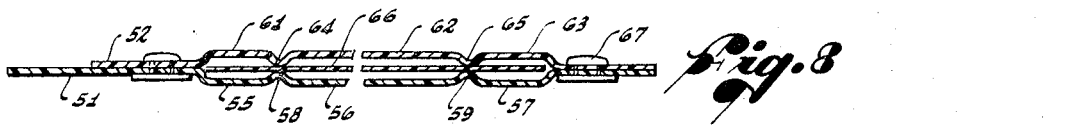
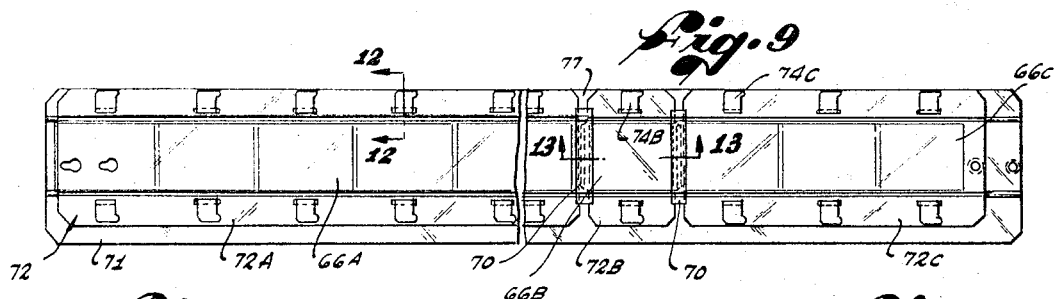
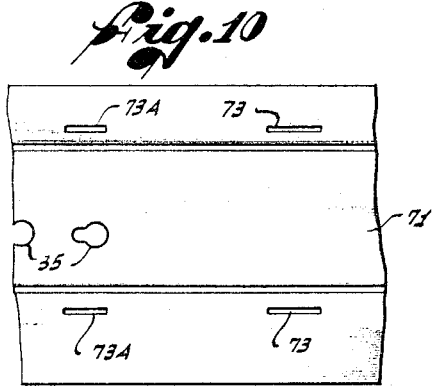
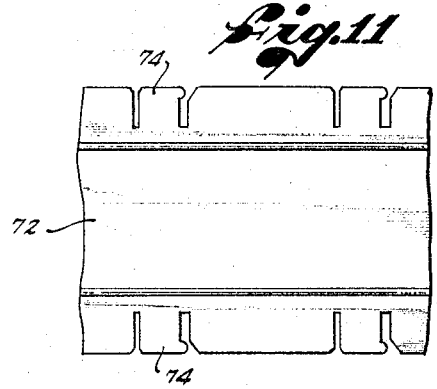
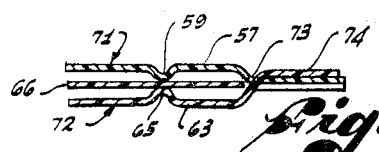
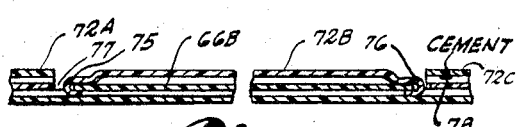
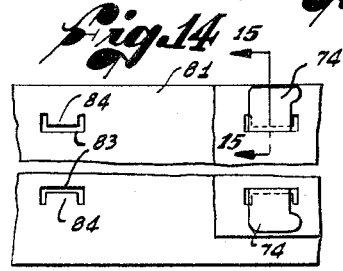
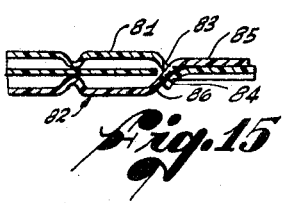
INVENTORS
RALPH H. BRANDT
JOHN P. SCHOENTGEN
BY Fulwider, Patton, Rieber
Lee, and Utecht
ATTORNEYS

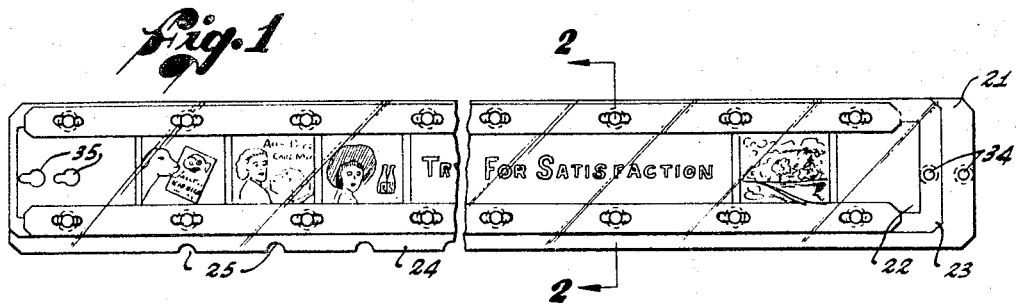
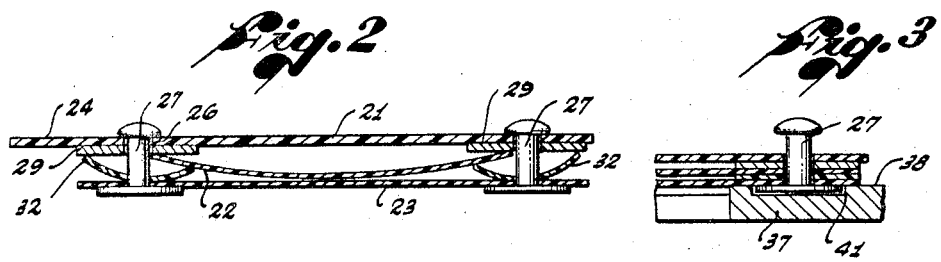
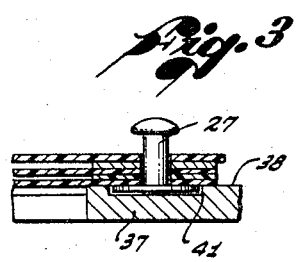
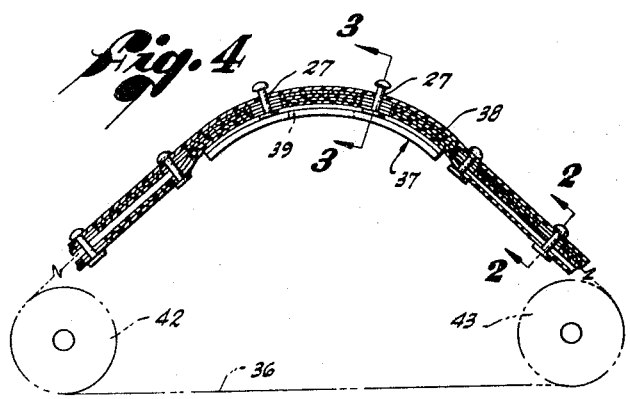
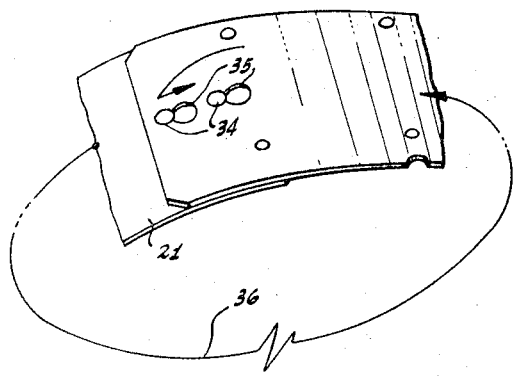
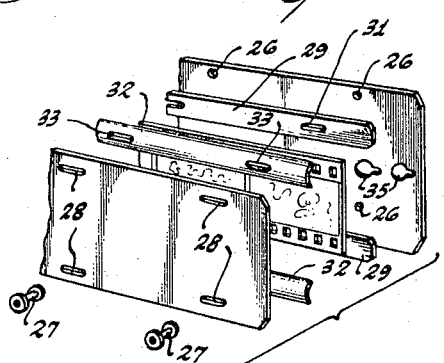

3,369,451
MOUNTING BELT FOR FILM TRANSPARENCIES
Ralph H. Brandt, 123 Columbia St., and John P. Schoentgen, 390 S. Grand Ave., both of Pasadena, Calif. 91105
Continuation-in-part of application Ser. No. 320,992, Nov. 4, 1963. This application July 27, 1966, Ser. No. 568,242
12 Claims. (Cl. 88—26)

---

ABSTRACT OF THE DISCLOSURE

The present invention is directed to mounting means for film strip and slides and more particularly to such a mounting including an optically clear supporting belt carrying a clear shield strip parallel thereto and with the film strip or slide supported between the belt and shield strip.

---

This application is a continuation-in-part of application Ser. No. 320,992 filed Nov. 4, 1963 for Projector Apparatus, now Patent No. 3,301,128, issued Jan. 31, 1967.

With the mounting according to the present invention scratches, smudges, and other marks on the film surfaces are prevented and preferably the major surface area of the film strip is mounted spaced from both the belt and the shield strips to inhibit transfer of heat directly through the belt and shield to the film strip.

The belt according to the present invention may in one embodiment be in the form of an endless loop which may be continuously or intermittently motor driven to provide for the projection and display of the film images in succession for long periods of time without attention and at very low operating costs.

The film strip mounting according to the present invention lends itself particularly to operation with the assembly supported against a curved projection gate whose surfaces curve in the direction of travel of the film strip and mounting belt. This resulting curvature of the belt and strip gives mechanical strength and stability thereto and prevents the film distorting or "popping" out of focus. Projection apparatus in which the film strip mounting of this invention may be utilized forms the subject of the parent application of which this is a continuation-in-part. The mounting of the present invention is adapted for use not only with film strip and slides of photographic type but also with other materials, translucent or opaque, through which an image may be projected. The projection will obviously be through translucent material, through cuts and the like in opaque material, and about opaque outlines. The term "film transparency" used hereinafter is to be construed to include all such photographic film and translucent or opaque projection materials.

The supporting belts of the mounting of the present invention and the shield strips associated therewith may be formed of any optically clear material of sufficient strength. As an example only, the belts may be formed of optically clear, tough and flexible plastic material such as that sold under the trademark "Mylar" and the shield or protective strip associated therewith to cover the film transparency may be made of a thinner strip of the same material.

In the belt mounting of the present invention, as the belt moves through a curved path, such as at a curved projection gate or at drive or spacing rollers or drums, the supporting belt, the film transparency and the shield strip will move in arcuate paths of different radii and provision is made for a small relative longitudinal movement between the film transparency and the belt at one side and between the transparency and the shield at the opposite side. By spacing at least the image portion of the film transparency from both the belt and the shield, this relative movement between the belt and shield strip and the film transparency occurs without scratching or smudging the film image. Furthermore, its spacing from the belt and shield strip provides dead air space which limits the transfer of heat to the film transparency when it is located at the projection gate and subjected to the projection lamp heat.

It is therefore an object of the present invention to provide an improved projective belt mounting for film transparencies.

Another object of this invention is the provision of an improved belt mounting for film transparencies which encloses them within an envelope providing for extended use without structural or surface wear or damage.

A further object of the present invention is the provision of an improved belt mounting for film transparencies, enclosing them within a protective shield and spacing the image surface of the transparencies from both the belt and the shield to inhibit scratching of the surfaces of the transparencies and the transfer of heat thereto.

A still further object of this invention is the provision of an improved belt mounting for film transparencies, enclosing them within a protective shield and spacing the surface areas of the transparency images from both the belt and the shield to inhibit scratching of the surfaces of the transparencies and the transfer of heat thereto, the belt, film transparencies and shield being mounted for limited relative longitudinal movement to accommodate movement of the belt mounting along a longitudinally curved path wherein the mounting elements move at different speeds.

Yet another object of this invention is the provision of an improved continuous-loop belt mounting for film transparencies including a shield strip parallel to the belt forming therewith a pocket in which the transparencies are disposed, the shield strip and belt being mounted with their major areas in spaced relation and provided with means permitting limited relative longitudinal movement therebetween.

These and other objects and features of the invention will be readily apparent to those skilled in the art from the following specification and the appended drawings in which:

FIGURE 1 is a view of a flattened belt mounting for a film transparency according to the present invention, taken from the side of the main supporting belt;

FIGURE 2 is an enlarged transverse sectional view on the line 2—2 of FIGURE 1;

FIGURE 3 is a partial detailed transverse sectional view of the belt mounting, longitudinally curved as at line 3—3 of FIGURE 4;

FIGURE 4 is a longitudinal sectional view through the belt mounting of FIGURE 1 as it passes around a curved projection gate, with the continuous-loop belt and rolls therefor diagrammatically illustrated;

FIGURE 5 is an enlarged detail of the connection between the ends of the belt of FIGURE 1 to form a continuous loop;

FIGURE 6 is an expanded perspective view of the elements of the belt mounting of FIGURE 1;

FIGURE 7 is a view similar to FIGURE 1 of a modified construction of belt mounting for film transparencies according to the present invention;

FIGURE 8 is an enlarged transverse sectional view on the line 8—8 of FIGURE 7;

FIGURE 9 is a view similar to FIGURE 7 showing a modified form of interlocking between the shield strip and the belt and the sectionalizing of the shield strip for transparencies of different lengths;

FIGURE 10 is an enlarged view of the supporting belt for the mounting of FIGURE 9;

FIGURE 11 is an enlarged view of the shield strip of the mounting of FIGURE 9;

FIGURE 12 is a detailed sectional view on the line 12—12 of FIGURE 9;

FIGURE 13 is a detailed longitudinal sectional view on the line 13—13 of FIGURE 9;

FIGURE 14 is a view showing a further modified interlock arrangement for the shield strip and supporting belt; and FIGURE 15 is a detailed transverse sectional view on the line 15—15 of FIGURE 14.

Referring first to the protective belt mounting for a continuous film strip shown in FIGURES 1-6, the supporting belt comprises an optically clear, tough, flexible main supporting strip 21 of, for example the plastic Mylar previously mentioned. Adjacent its opposite edges the belt 21 is provided with rows of holes 26 in which are mounted collar-button-like studs 27. A film strip 22 is mounted freely between the longitudinally extending rows of studs 27 and is backed by a thin shield strip 23 which has longitudinally extending slots 28 therein receiving the shanks of the studs 27. The strip is substantially wider than both the film strip 22 and the shield strip 23, being provided with an extended edge 24 in which may be cut notches 25 for control signalling or the like.

Against the inner face of the belt 21 are disposed a pair of elongated flat spacer strips 29 having slots 31 therethrough also receiving the shanks of the studs 27. The spacer strips 29 are thereby disposed between the edges of the film strip 22 and the belt 21. A pair of longitudinally extending spacer strips 32 are disposed between the edges of the film strip 22 and the shield strip 23 and have longitudinally extending slots 33 therethrough receiving the shanks of the studs 27. The spacer strips 32 are transversely curved, as shown in FIGURES 2 and 6, and may also be formed of Mylar or a like material which has been given a permanent set under heat. The spacing strips 32 are resilient and tend to return to their curved form to move the shield strip 23 away from the belt strip 21, as shown in FIGURE 2, to provide for the widest separation of the film strip 22 from the shield strip except at pressure surfaces. The ends of the belt strip 21 may be connected together in releasable fashion by studs 34 passing through holes in the right-hand end of belt 21 as shown in FIGURE 1, and through keyhole slots 35 in the other end of the belt to thereby join the ends of the belt 21 into a continuous loop 36 as shown in FIGURE 5.

The operation of the mounting belt of this exemplification in passing over a curved gate surface is shown in FIGURES 3 and 4 wherein such a gate is shown at 37 having an exterior curved surface 38 and a gate opening 39. The curved gate surface 38 may be provided with spaced grooves 41 to receive the bases of the studs 27. In passing over the curved gate surface 38 the belt 21 presses against the other elements of the mounting to compress the curved spacer strips 32 in the substantial flat configuration shown in FIGURES 3 and 4. The opposite edges of the shield strip 23 are thereby pressed against the surface 38 through the spacer strips 32, the edges of film strip 22, the spacer strips 29 by the belt strip 21. Free spaces are still provided at the opposite faces of the film strip which inhibit scratching or smudging of both the emulsion and opposite surfaces of the film strip and also inhibits heating of the film strip by the projection lamp.

FIGURE 4 diagrammatically illustrates the continuous belt 36 passing over not only the projection gate 37 but also around a pair of rollers 42 and 43, one of which may be continuously or intermittently driven to drive the continuous-loop belt 36 by its frictional engagement therewith, without hole and sprocket connection.

As the belt 36 in the exemplification of the invention shown in FIGURES 1-6 passes over the gate 37 and the drums or rollers 42, 43, the shield strip 23 will be curved to a smaller radius than the belt strip 21, with the spacer strips 32, the film strip 22 and the spacer strips 29 in progressively increasing radii between the shield strip 23 and the belt 21. The strips of the belt 36 will therefore be moving at different speeds while curved because of their different radii and there will be a small relative longitudinal movement therebetween. The studs 27 and slots 28, 33 and 31 permit small longitudinal movements of the strips 23, 29 and 33 relative to each other and to the belt strip 21. Likewise, the film strip 22, which is retained only at its forward end by the studs 34 or by cementing to the shield strip thereat, is free to make necessary longitudinal adjustments relative to the supporting belt strip 21.

It will therefore be seen that the exemplary mounting of FIGURES 1-6 suspends a film transparency freely between the belt spacers 29 and the shield strip spacers 32 within the space provided between the belt 21 and the shield strip 23 so that no substantial force is exerted against the surfaces of the transparency and its surfaces are protected against scratching and smudging. While the mounting belt provides for small relative longitudinal movement between its strip elements as the belt moves around in curved and straight paths in its movement past the projection gate and drums, this relative longitudinal movement therefore occurs without injury to the transparency surfaces. The mounting supports the film strip on a heavy, tough belt which is driven to carry the film strip therewith to inhibit wear on the film strip such as caused by direct sprocket drive. This, coupled with the protection of the film strip surfaces within the envelope formed by the spaced supporting belt and shield strip contributes to almost unlimited use of the film strip in a projector without deleterious effect on its physical structure or the optical image projected therefrom.

The film strip mounting of FIGURES 7 and 8 is of a simplified form but having many of the attributes of the previously described exemplification in supporting a film transparency for long life without structural or optical damage thereto. The main supporting belt of this embodiment is shown at 51 and the shield strip at 52. The main belt 51 again has an extended edge at 53 into which may be cut signal notches 54. The belt 51 is heat molded or embossed to form three parallel outwardly extending channel portions 55, 56 and 57 separated by longitudinally extending ridges 58 and 59. Likewise, the shield strip 52 is heat molded or embossed to provide three longitudinally extending channel portions 62, 62 and 63 separated by longitudinally extending ridges 64 and 65. The channel portions on the belt strip 51 and shield strip 52 are disposed opposite complementary channels on each other so that the ridges 58 and 64 and 59 and 65 substantially align to hold a film strip 66 therebetween with its major surface area out of contact with both the belt and the shield strip.

The channel portions 56 and 62 extend transversely the full width of the image portion of the film strip 66, which portion is thereby maintained out of contact with both the belt and shield strips to prevent scratching and smudging of both surfaces of the film strip and to provide a dead air space to inhibit heating of the film strip by the projection lamp. The film strip 66 is locked to the belt or shield strip at its forward end but may move relative thereto throughout its length. The belt and shield strips are held together by studs 67 extending through holes in one of the strips and slots 68 through the other of the strips to permit longitudinal movement between the belt and shield strips as they move in a curved path. Since the belt and shield strips contact the film strip 66 only at the ridges 58, 64, and 69, 65, outside of the image area, relative movement between the parts is accomplished without damage to the film strip emulsion.

Since the channels 55, 61, 57, 63 are located outside of the image area of the film transparency, their inclusion is not essential to the construction of the exemplification of FIGURES 7 and 8 but they are considered desirable to add rigidity to the belt and shield strips at their outside edges to help keep them flat.

The exemplification shown in FIGURES 9-13 differs from that of FIGURES 7 and 8 in several respects. It includes the same channel and ridge embossing previously described but the shield and belt strips are held together by interlocking slot and finger formations adjacent their opposite edges and substantially at the outside edges of the channels 55, 61, 57, 63. In this exemplification the belt 71 supports the shield strip 72 by means of slots 73 through the belt at the outside edges of the channels 55 and 57. The shield strip has complementarily located fingers 74 cut out of its opposite edges beyond the channels 61 and 63 and the fingers 74 are projected through the slots 73 to interlock the edges of the belt and shield strips together, as shown in FIGURES 9 and 12. The slots 73A adjacent the forward end of the belt strip 51 at substantially the same width as the fingers 74 on the shield strip 72 to lock the forward ends of the shield and belt strips together against relative longitudinal movement. The other slots 73 are wider than the fingers 74 to permit the small relative longitudinal movement between the belt and shield strips previously described. With this arrangement also, the forward end only of the film strip is positively held in the mounting.

FIGURES 9 and 13 further show the sectioning of the shield and film transparencies into smaller elements, the shield strip being shown in at least three sections 72A, 72B, and 72C. The construction of the shield strip section 72A and of the elongated film strip 66A therein are as previously described. Within the shield strip section 72B is a single film chip or slide 66B held therein by forward and rear central return bent portions 75 and 76 which are heat molded into the hook shape of FIGURE 13 to have the forward and rear edges of the film chip or slide 66B supported therein. The finger 74B is preferably the same width as the slot through which it extends to prevent longitudinal movement of the shield strip 72B relative to the belt 71 and a space 77 is left between the edges of the shield strip sections 72A and 72B to permit longitudinal movement of the rear end of the shield strip section 72A relative to the belt 71.

Shield strip section 72C is similar to the shield strip section 72A and has its forward locking fingers 74C the same size as the slots through which they project to prevent relative longitudinal movement between the belt 71 and the shield strip 72C at this point. The forward end of the film strip 66C may be cemented or taped to the forward end of the shield strip section 72C, as at 78.

The spaces between the film transparencies in shield strip sections 72A, 72B and 72C may be optically blacked out by opaque foil strip 70 between the sections. These strips may be adhered to any desired surface, for example the outside surface of belt 71 may be readily applied and removed, as required.

From the arrangement of FIGURES 9 and 13 it will be seen that the complete belt may be made up of any desired number of different length strips, chips, slides or other film transparencies to permit the ready intermixing of different images and types thereof without requiring preparation of a new transparency the entire length of the belt. This versatility applies to all of the embodiments of the invention disclosed herein.

FIGURES 14 and 15 show a slightly modified interlocking arrangement between the edges of a shield strip 82 and its supporting belt 81. The slots 83 in the belt 81 are U-shaped to provide short flaps 84 extending toward the axis of the belt. The shield strip 82 has fingers 85 similar to the fingers 74 but having their bases spaced further from the edges of the strip by shortening the width of its outside channels at 86. When the finger 85 is extended through the bight of slot 83 the flap 84 thereof is pressed outwardly as shown in FIGURE 15.

The film transparency belt mounting disclosed herein may be driven by frictional engagement with one of the drums or rollers 42, 43, thus avoiding sprocket hole drive and attendant wear on the film strip or belt thereat. The film transparencies or image source materials are supported throughout the length of the belt along both edges without strain or tension being imposed on the material of the transparency. The envelope provided by the belt and shield strips provides a protective enclosure and the spacing between the film transparency and the belt and shield strip provides a dead air space to reduce heating and to prevent scratching of the emulsion or other transparency surface as the belt element move relative to each other in passing in a curved path. The mounting of this invention therefore provides for long-life continuous or intermittent operation without attention and without structural or optical damage to the film transparency. The avoidance of sprocket hole film is also an important economy in the preparation of programmed material which can be typed, drawn, written or otherwise produced, on ordinary paper by way of example, and supported in the belt-mounting according to the present invention.

The mounting of this invention in providing for the mixing of slides, film strips, printing, drawing, etc., of various lengths, greatly facilitates the program which may be included in the projected images and permits the ready change of individual items without requiring the preparation of an entirely new program strip.

These and other features of the invention will be readily apparent and while certain embodiments and exemplifications have been specifically illustrated and described it is understood that the invention is not limited thereto as many variations may be made therein without departing from the spirit of the invention which is to be given its broadest interpretation within the terms of the following claims.

We claim:

1. A mounting for a film transparency strip comprising: an optically clear, flexible supporting belt; a flexible shield strip mounted on said belt parallel thereto, said shield strip also being of optically clear material; means spacing at least the central portion of said shield strip from said belt to form therewith an elongated flat pocket, said spacing means being divided between said belt and shield strip; and a film transparency strip mounted between said belt and shield strips and slidably engaged by the divided portions of said spacing means to mount at least the image portion of said film transparency strip in said pocket substantially out of contact with both said belt and shield strip and movable relative thereto; and means at the ends of said belt for connecting them together into a continuous belt loop.

2. The mounting defined in claim 1 including: means interconnecting said belt, film transparency strip and shield strip for limited relatively longitudinal movement therebetween except for an anchor point for the film strip transparency adjacent the forward end thereof.

3. The mounting defined in claim 1 in which said shield strip is composed of longitudinally discrete sections enclosing film transparency strip sections of substantially the same length as the shield strip sections and in which the forward end of each transparency strip section is independently anchored.

4. The mounting defined in claim 3 including: opaque strips extending transversely of the mounting at the junctions between said shield strip sections to prevent passage of light between the film transparency strip sections.

5. The mounting defined in claim 1 including: studs extending through openings adjacent the opposite edges of the belt and shield strip outside of the edges of the film transparency strip to hold the belt and shield strip together while permitting limited relative longitudinal movement therebetween.

6. The mounting defined in claim 1 in which the spacing means between the belt and the shield strip comprises double spacer strips mounted between said belt and shield strip in longitudinally-extending, transversely-spaced pairs, said film transparency strip being mounted with its edges between said double spacer strips.

7. The mounting defined in claim 6 including: studs extending through openings in said belt, shield strip and double spacer strips outside of the edges of said film transparency strip, at least certain of said openings being elongated longitudinally to permit limited relative movement between the belt, spacer strips and shield strips.

8. The mounting defined in claim 6 in which at least one in each double spacer strip is transversely curved and resilient to bias the shield strip away from the belt but compressible as the mounting moves over a supporting surface to move the shield strip and belt relatively together to the minimum distance determined by the thicknesses of the spacer strips and film transparency strip.

9. The mounting defined in claim 1 in which said means for spacing the shield strip from the belt comprises cooperating ridges on the inner surfaces of the belt and shield strip which engage the film transparency strip therebetween outside of the image areas of the field transparency strip.

10. The mounting defined in claim 1 in which said belt and shield strips have a plurality of longitudinally extending channels embossed outwardly therefrom and separated by ridges which are substantially opposed and engage to support the film transparency strip therebetween in spaced relation to the bottom surfaces of said channels, the central channels on said belt and shield strip having a transverse width at least as great as the image area of the film transparency strip and the extreme edges of said film transparency strip being disposed in the outside channels on said belt and film strip.

11. The mounting defined in claim 10 including: means interlocking the edges of said belt and shield strip at the outside of said channels and providing for limited relative longitudinal movement between the belt and shield strip.

12. The mounting defined in claim 11 in which said interlocking means comprises complementary slots and fingers adjacent the edges of said belt and shield strip which interlock to assemble the shield strip on the belt and which provide clearance except at the front edge of the shield strip for said limited relative longitudinal movement.

References Cited

UNITED STATES PATENTS

| | | | |
|---|---|---|---|
| 1,967,534 | 7/1934 | McClean | 88—26 |
| 2,837,853 | 6/1958 | Bing | 88—26 |
| 3,264,936 | 8/1966 | Schultz et al. | 88—26 |

NORTON ANSHER, *Primary Examiner.*

WINDHAM M. FRYE, RICHARD M. SHEER,
*Assistant Examiners.*